GAS ALARM CIRCUIT
Filed March 9, 1962
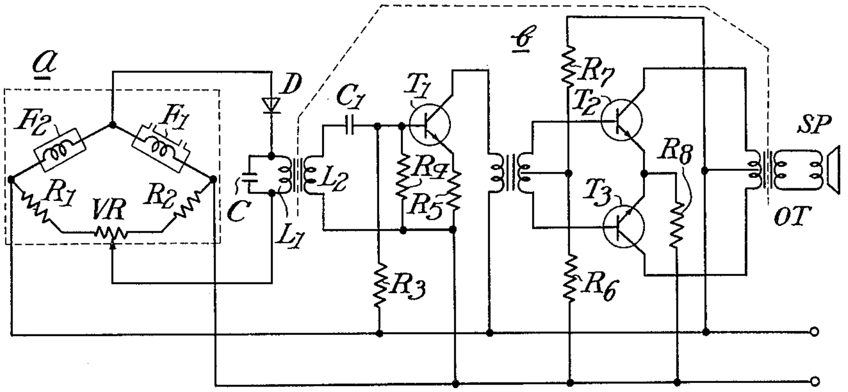
Tokihiko Yoneda
Inventor
By George B. Oujevolk
Attorney United States Patent Office 3,221,320

Patented Nov. 30, 1965

3,221,320
GAS ALARM CIRCUIT

Tokihiko Yoneda, Chuo-ku, Tokyo-to, Japan, assignor to Komyo Rikagaku Kogyo Kabushiki Kaisha, Tokyo-to, Japan, a joint-stock company of Japan Filed Mar. 9, 1962, Ser. No. 178,743
Claims priority, application Japan, Apr. 13, 1961, 36/12,648
4 Claims. (Cl. 340—237)

The present invention relates to gas alarm systems and more particularly to a gas alarm system which has no mechanical components or moving mechanical parts.

In a conventional gas alarm system, the output of the gas concentration detecting circuit is led to a meter relay and let out as an ON-OFF output, or this output is led through a pre-amplifier to a relay and led out as an alarm output. The operational flow sequences in these cases are as follows:

Detecting circuit output→Meter relay→Amplifier→Power relay→Alarm;

or

Detecting circuit output→Amplifier→Relay→Power relay→Alarm;

Since several stages of mechanical switching elements and a preamplifier are indispensable, the apparatus becomes large and it has been extremely difficult to maintain operational stability over long periods of time.

It is an object of the present invention to provide a new gas alarm system circuit of simple arrangement which does not require a preamplifier and a large number of mechanical switching elements, and which can be operated with stability over long periods of time.

Another object of the present invention is to provide a circuit as above-stated which has a relatively low power consumption, is easily adjusted, and has a wide range of practical applications.

Said objects and other objects of the present invention have been attained by a gas alarm arrangement comprising a hot-wire type gas concentration detection circuit including a variable resistance, an oscillation circuit coupled to the output of said detection circuit which is preset, by a bias potential imposed thereon by controlled regulation of the said variable resistance, to oscillate when the output of the detection circuit reaches a predetermined value. A coupling circuit which is connected to the oscillation circuit couples the oscillating circuit to an amplifier the output of which activates an audio alarm device, so that, when the oscillating circuit oscillates, the oscillation is amplified at a desired audio frequency to be emitted at a desired intensity in a audible manner.

The nature and details of the invention as well as the manner in which the afore-stated objects may best be achieved will be more clearly apparent by reference to the following description of one representative embodiment of the invention when taken in conjunction with the accompanying drawing, which is an electrical circuit diagram of a circuit embodying the invention.

The input side of the embodiment illustrated consists of a gas concentration detection circuit *a* which is a bridge circuit comprising an exposed detecting hot wire $F_1$, a compensating hot wire $F_2$, fixed resistors $R_1$, $R_2$, and a variable resistor VR for alarm giving. The hot wires $F_1$ and $F_2$ have an equal electrical resistance and are made of platinum the surfaces of which have been activated and caused to have extremely high catalytic efficiency. The compensating hot wire $F_2$ is hermetically sealed within a container containing pure air. The output side of the circuit *a* is connected in series with an oscillating circuit D which includes a tunnel diode and an LC coupling circuit consisting of a capacitor C and an inductance coil $L_1$. Coil $L_1$ in turn is coupled to an inductance coil $L_2$ of an amplifier *b*, the output of which is impressed on a loudspeaker SP. The amplifier *b* comprises a condenser $C_1$, resistors $R_3$–$R_8$, transistors $T_1$, $T_2$ and $T_3$, and an output transformer OT. In this embodiment, a common power supply is used for the circuits *a* and *b*.

The above-described arrangement operates as follows: The exposed detecting hot wire $F_1$ is exposed to an atmosphere of the gas to be detected, and the compensating hot wire $F_2$ is preheated by an electric current to the same temperature as the hot wire $F_1$. The output of the gas concentration detection circuit *a* is then obtained as a function of the ratio of the resistance (which is a function of the gas concentration) of the hot wire $F_1$ to the resistance of the hot wire $F_2$.

The alarm point is set by regulating the output potential of the detecting circuit by means of the variable resistor VR. When the gas is detected and the output of the circuit *a* cancels the bias due to the variable resistor VR and has reached a value corresponding to the peak voltage of the diode's characteristic immediately prior to its unstable region, oscillation occurs at the instant of transition of the oscillating element D to its unstable region. This oscillation, the frequency of which may be regulated to a desired audio frequency by suitably selecting the coil $L_1$ and capacitor C of the coupling circuit, is then amplified by the amplifier *b* and caused to activate the loudspeaker SP, whereby an alarm is sounded.

Since, in the gas alarm circuit of the present invention, the variable resistance for circuit balancing is utilized additionally as a resistance for regulating the oscillation point of the alarm oscillation circuit, that is, for setting the alarm, the composition of the circuit is extremely simple and is easily adjusted. Accordingly, this circuit may be used for a wide range of applications. For example, it may be used to detect continuously the concentration of an explosive gas and sound an alarm when the said concentration reaches the lower explosive limit of the said gas, or it may be used continuously to detect the occurrence of leakage of a noxious gas and sound an alarm when such a leakage occurs.

Moreover, by the utilization of an oscillation element in the manner according to this invention, it is possible to obtain a continuous output variation of the gas concentration detection circuit, directly, as a switching oscillation output, without the use of any mechanical conversion medium. Therefore, it is possible to manufacture a gas alarm system which is substantially more compact than a conventional system of similar type, and which, moreover, consumes only a low rate of power.

Although this invention has been described with respect to a particular embodiment thereof, it is not to be so limited as changes and modifications may be made therein which are within the full intended scope of the invention, as defined by the appended claims.

What is claimed is:

1. A gas alarm arrangement, comprising in combination;

a gas detection circuit providing an output having a predetermined value upon detecting a particular gas;

an oscillation circuit coupled to said detection circuit, including on its input side a semiconductor diode having a negative resistance region and accomplishing a switching operation upon receiving an input over the peak point thereof, said diode passing current upon receiving an input exceeding said peak point, said oscillation circuit supplying a signal in response to the action of said diode;

amplifying means coupled to the output of said oscillation circuit receiving and amplifying said signal; and alarm giving means responsive to said amplifying means providing an alarm in response to said amplified signal.

2. A gas alarm arrangement, comprising in combination;

a gas detection circuit providing an output having a predetermined value upon detecting a particular gas;

an oscillation circuit including a semiconductor diode on the input side thereof coupled to said detection circuit, said diode having a negative resistance region and accomplishing a switching operation upon receiving an input over a peak point thereof, a tank circuit including an inductance coil and capacitor connected in parallel, said tank circuit being in series with said diode supplying a signal in response to the action of said diode;

amplifying means coupled to the output of said oscillation circuit receiving and amplifying said signal; and, alarm giving means responsive to said amplifying means providing an alarm in response to said amplified signal.

3. A gas alarm arrangement, comprising in combination;

a gas detection circuit providing an output having a predetermined value upon detecting a particular gas including a bridge circuit having a variable resistor adapted to balance said circuit, said circuit biasing a potential reaching a peak point of a diode in the next circuit stage;

an oscillation circuit as the next circuit stage, coupled to said detection circuit and including a semiconductor diode balanced by said variable resistor, connected to said bridge circuit so that said diode passes an output signal when the bias potential preset by said bridge circuit is canceled by the output signal of the detecting circuit and the peak point of the diode is exceeded, a tank circuit including an inductance coil and capacitor connected in parallel, said tank circuit being in series with said diode supplying a signal in response to the action of said diode;

amplifying means coupled to the output of said oscillation circuit receiving and amplifying said signal; and alarm giving means responsive to said amplifying means providing an alarm in response to said amplified signal.

4. A gas alarm arrangement, comprising in combination;

a bridge-type gas detection circuit providing an output signal having a predetermined value upon detecting a particular gas including an exposed hot wire, a shielded wire, first and second resistors to balance said wires and an adjustable bias resistor for fine balancing;

an oscillation circuit including, a semiconductor diode responsive to the bridge-type gas detection circuit on the input side of said oscillation circuit coupled to said detection circuit, said diode only passing current upon receiving an input having at least said predetermined value, a tank circuit including an inductance coil and capacitor in series with said diode supplying a signal in response to the action of said diode;

amplifying means coupled to the output of said oscillation circuit receiving and amplifying said signal; and alarm giving means responsive to said amplifying means providing an alarm in response to said amplified signal.

References Cited by the Examiner

UNITED STATES PATENTS

| | | | |
|---|---|---|---|
| 2,406,804 | 9/1946 | Chatterjea et al. | 331—107 |
| 2,805,134 | 9/1957 | Strange | 73—27 |
| 2,837,652 | 6/1958 | Nailen | 331—107 |
| 2,879,663 | 3/1959 | Thomas | 73—26 |
| 3,013,149 | 12/1961 | Harasek | 325—318 |

FOREIGN PATENTS

| | | |
|---|---|---|
| 113,867 | 9/1941 | Australia. |
| 835,933 | 5/1960 | Great Britain. |

OTHER REFERENCES

IBM Technical Disclosure Bulletin; Light Powered Oscillator by Miller; vol. 3, No. 4, September 1960.

NEIL C. READ, *Primary Examiner.*